United States Patent
Yang et al.

(10) Patent No.: US 10,604,009 B2
(45) Date of Patent: Mar. 31, 2020

(54) DUAL-SHAFT GEARBOX MECHANISM

(71) Applicant: INDUSTRIAL TECHNOLOGY RESEARCH INSTITUTE, Hsinchu (TW)

(72) Inventors: Cheng-Ping Yang, Hsinchu (TW); Ming-Hsien Yang, Hsinchu (TW); Chia Tsao, Hsinchu (TW); Li-Te Huang, Hsinchu (TW); Peng-Yu Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 43 days.

(21) Appl. No.: 16/050,619

(22) Filed: Jul. 31, 2018

(65) Prior Publication Data

US 2019/0351762 A1    Nov. 21, 2019

(30) Foreign Application Priority Data

May 16, 2018    (TW) .............................. 107116679 A

(51) Int. Cl.
  *B60K 17/08*    (2006.01)
  *B60K 17/346*   (2006.01)
  *B60K 23/08*    (2006.01)
  *F16H 57/037*   (2012.01)
  *F16H 37/08*    (2006.01)
  (Continued)

(52) U.S. Cl.
  CPC .......... *B60K 17/3467* (2013.01); *B60K 17/08* (2013.01); *B60K 23/0808* (2013.01); *F16H 37/082* (2013.01); *F16H 57/037* (2013.01); *F16H 57/023* (2013.01); *F16H 57/029* (2013.01)

(58) Field of Classification Search
  CPC ................ B60K 17/08; B60K 17/3467; B60K 23/0808; F16H 37/082; F16H 57/023; F16H 57/029; F16H 57/037
  USPC .......................................................... 475/206
  See application file for complete search history.

(56) References Cited

U.S. PATENT DOCUMENTS 4,417,642 A * 11/1983 Suzuki ............... B60K 17/3467
                                                              180/249
4,420,059 A * 12/1983 Suzuki ...................... F16H 3/66
                                                              180/248
(Continued)

FOREIGN PATENT DOCUMENTS

CN        1224786 C    10/2005
CN      103066748 A     4/2013
(Continued)

OTHER PUBLICATIONS

Taiwan Patent Office, Office Action, Patent Application Serial No. TW107116679, dated Nov. 29, 2018, Taiwan.
(Continued)

*Primary Examiner* — Leslie A Nicholson, III
(74) *Attorney, Agent, or Firm* — Rabin & Berdo, P.C.

(57) ABSTRACT

A dual-shaft gearbox mechanism includes a hollow shaft motor, first and second gear sets, first and second shafts, a clutch and a unidirectional assembly. When the dual-shaft gearbox mechanism is in a first gear, power is outputted via the first gear set and the unidirectional assembly. When the dual-shaft gearbox mechanism is in a second gear, power is outputted via the clutch and the second gear set.

19 Claims, 3 Drawing Sheets

(51) Int. Cl.
*F16H 57/023* (2012.01)
*F16H 57/029* (2012.01)

(56) References Cited

U.S. PATENT DOCUMENTS

| | | | |
|---|---|---|---|
| 4,674,358 A * | 6/1987 | Nishimura | B60K 5/04 |
| | | | 74/360 |
| 4,771,656 A | 9/1988 | Itoh et al. | |
| 4,938,096 A * | 7/1990 | Takahashi | B60K 17/06 |
| | | | 475/204 |
| 5,149,307 A * | 9/1992 | Malloy | B60K 17/06 |
| | | | 475/198 |
| 5,640,882 A * | 6/1997 | Mueller | B60K 17/08 |
| | | | 74/333 |
| 6,019,695 A * | 2/2000 | Kobayashi | B60K 17/3462 |
| | | | 180/248 |
| 7,669,495 B2 * | 3/2010 | Kasuya | F16H 3/006 |
| | | | 192/14 |
| 8,888,647 B2 | 11/2014 | Ekonen et al. | |
| 8,961,353 B2 | 2/2015 | Valente et al. | |
| 8,986,148 B2 | 3/2015 | Downs et al. | |
| 9,114,799 B2 | 8/2015 | Tsukamoto et al. | |
| 9,205,739 B2 | 12/2015 | Ekonen et al. | |
| 9,404,414 B2 | 8/2016 | Versteyhe et al. | |
| 9,416,858 B2 | 8/2016 | Versteyhe et al. | |
| 9,488,258 B2 * | 11/2016 | Ichikawa | F16H 29/04 |
| 9,556,914 B2 | 1/2017 | Dupere | |
| 2007/0049451 A1 | 3/2007 | Mizon et al. | |
| 2008/0242466 A1 * | 10/2008 | Kasuya | F16H 3/006 |
| | | | 475/206 |
| 2011/0079097 A1 | 4/2011 | Cavallino | |
| 2012/0053012 A1 | 3/2012 | Yamada et al. | |
| 2013/0192394 A1 | 8/2013 | Ekonen et al. | |

FOREIGN PATENT DOCUMENTS

| | | |
|---|---|---|
| CN | 103573856 A | 2/2014 |
| CN | 103921674 A | 7/2014 |
| CN | 203766510 U | 8/2014 |
| CN | 205780633 U | 12/2016 |
| TW | M431245 U | 6/2012 |
| TW | I475165 B | 3/2015 |

OTHER PUBLICATIONS

Fu et al., A novel control scheme of propulsion motor for integrated powertrain of electric bus; Vehicle Power and Propulsion Conference, 2009; 2009; pp. 1938-8756.

Sorniotti et al., A Novel Seamless 2-speed Transmission system for Electric Vehicles Principles and Simulation Result; SAE International; 2011; pp. 37-0022.

Shin et al., Design of 2-Speed Transmission for Electric Commerial Vehicle; International Journal of Automotive Technology; Feb. 14, 2014; 15(1), pp. 145-150.

Gao et al., Investigation of proper motor drive characteristics for military vehicle propulsion; SAE International; Jun. 23, 2003.

Sorniottil et al., Analysis and simulation of the gearshift methodology for a novel twospeed transmission system for electric powertrains with a central motor; Proc IMechE Part D:J Automobile Engineering; Jan. 10, 2012; 226(7), pp. 915-929.

Hong et al., Shift Control of a dry-type tow-speed dual-clutch transmission for an electric vehicle; Pro IMechE Part D: J Automobile Engineering; May 24, 2015; 230(3), pp. 308-321.

* cited by examiner

DUAL-SHAFT GEARBOX MECHANISM

CROSS-REFERENCE TO RELATED APPLICATIONS

This application claims priority to Taiwanese application serial No. 107116679, filed on May 16, 2018. The entirety of the Taiwanese application is hereby incorporated by reference herein and made a part of this specification.

FIELD OF THE DISCLOSURE

The present disclosure relates to gearboxes, and, more particularly, to a dual-shaft gearbox mechanism applicable to a transport machine.

BACKGROUND OF THE DISCLOSURE

Current transmission mechanisms used in general vehicles are not only complicated but also high in cost. A golf cart does not require high speed and a complicated shift mechanism, so it is simply impractical and uneconomical to use a transmission mechanism for a general vehicle in a golf cart.

Therefore, there is a need for a solution that addresses the aforementioned issues in the prior art.

SUMMARY OF THE DISCLOSURE

The present disclosure provides a dual-shaft gearbox mechanism, which may include: a hollow shaft; a first shaft axially furnished in the hollow shaft; a first gear set including a first transmission gear connected to the hollow shaft; a second gear set including a second transmission gear connected to the hollow shaft; a unidirectional assembly connected to the first gear set; a clutch connected to the second gear set; a transmission mechanism coupled with the first gear set or the second gear set; and a differential connected to the first shaft and coupled with the transmission mechanism.

In an embodiment, the dual-shaft gearbox mechanism may further include a hollow shaft motor for driving the hollow shaft. In another embodiment, the hollow shaft motor may rotate in a clockwise or anticlockwise direction to drive the first gear set or the second gear set in order to change the direction of a transport machine.

In an embodiment, the hollow shaft transmits power generated by a hollow shaft motor to the first gear set or the second gear set.

In an embodiment, the first shaft and the hollow shaft are on the same axis.

In an embodiment, the first gear set further includes a driven gear coupled with the unidirectional assembly. In another embodiment, the unidirectional assembly is coupled with the driven gear of the first gear set, so that the driven gear drives the transmission mechanism.

In an embodiment, the second gear set further includes a driven gear coupled with the clutch. In another embodiment, the clutch is coupled with the driven gear of the second gear set, so that the driven gear drives the transmission mechanism.

In an embodiment, the transmission mechanism further includes a second shaft coupled with the first gear set or the second gear set and a gear coupled with the second shaft.

In an embodiment, the transmission mechanism is coupled to the differential via a gear.

In an embodiment, the unidirectional assembly is a one-way bearing.

In an embodiment, when the dual-shaft gearbox mechanism is in a first gear, a power transmission path includes the hollow shaft driving the first transmission gear of the first gear set via the hollow shaft motor, and the first transmission gear in turn drives the transmission mechanism in cooperation with the unidirectional assembly to output power to the differential. In another embodiment, when in the first gear, the power transmission path outputs power via the first gear set, while the second gear set is in an idle state.

In an embodiment, when the dual-shaft gearbox mechanism is in a second gear, a power transmission path includes the hollow shaft driving the second transmission gear of the second gear set via the hollow shaft motor, and the second transmission gear in turn drives the transmission mechanism in cooperation with the clutch to output power to the differential. In another embodiment, when in the second gear, the clutch engages the second gear set to output power via the second gear set, while the first gear set is in an idle state.

In an embodiment, the first gear set further includes a driven gear coupled with the first transmission gear to drive the transmission mechanism.

In an embodiment, the second gear set further includes a driven gear coupled with the second transmission gear to drive the transmission mechanism.

In the first gear (e.g., a low gear), the power transmission path includes the hollow shaft motor driving the hollow shaft to drive the first transmission gear of the first gear set. Through the transmission mechanism is in cooperation with the unidirectional assembly, the gear of the transmission mechanism outputs power to the other gear. The other gear then drives the differential. As the clutch is not engaged with the driven gear of the second gear set, the second gear set does not output power and is in an idle state.

In the second gear (e.g., a high gear), the clutch is engaged with the driven gear of the second gear set (e.g., the clutch 16 moves towards and engages with the driven gear of the second gear set), so the power transmission path of the dual-shaft gearbox mechanism includes the hollow shaft motor driving the hollow shaft to drive the second transmission gear of the second gear set. The second transmission gear then drives the driven gear of the second gear set. Through the second shaft of the transmission mechanism, the gear of the transmission mechanism is driven to output power to the other gear. The other gear then drives the differential. As the unidirectional assembly is not actuated, the first gear set does not output power and is in an idle state.

DETAILED DESCRIPTION OF THE EMBODIMENTS

Figure 1:
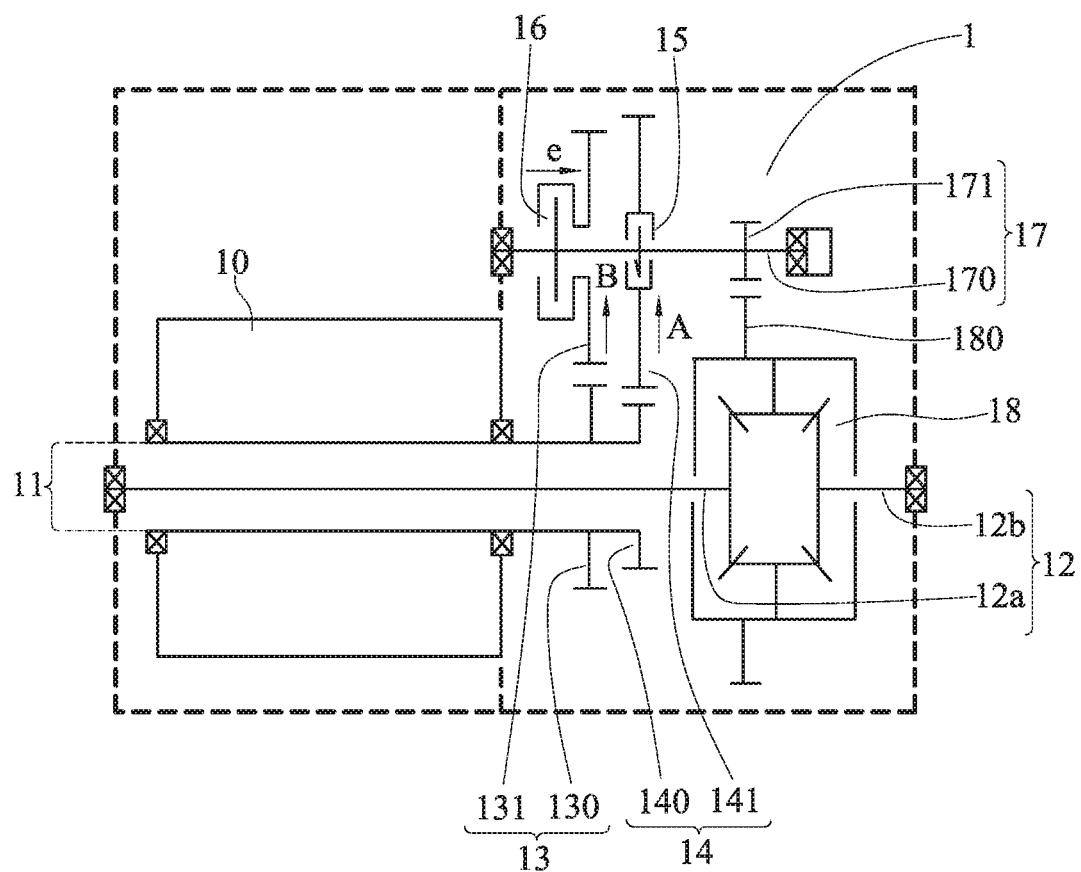
FIG. 1 is a schematic diagram illustrating a dual-shaft gearbox mechanism in accordance with the present disclosure.

The technical content of present disclosure is described by the following specific embodiments. One of ordinary skill in the art can readily understand the advantages and effects of the present disclosure upon reading the disclosure of this specification. The present disclosure may also be practiced or applied with other different implementations. Based on different contexts and applications, the various details in this specification can be modified and changed without departing from the spirit of the present disclosure.

It should be noted that the structures, ratios, sizes shown in the drawings appended to this specification are to be construed in conjunction with the disclosure of this specification in order to facilitate understanding of those skilled in the art. They are not meant, in any ways, to limit the implementations of the present disclosure, and therefore have no substantial technical meaning. Without affecting the effects created and objectives achieved by the present disclosure, any modifications, changes or adjustments to the structures, ratio relationships or sizes, are to be construed as fall within the range covered by the technical contents disclosed herein. Meanwhile, terms, such as "first", "second", "one", "a", "an", and the like, are for illustrative purposes only, and are not meant to limit the range implementable by the present disclosure. Any changes or adjustments made to their relative relationships, without modifying the substantial technical contents, are also to be construed as within the range implementable by the present disclosure.

Figure 2:
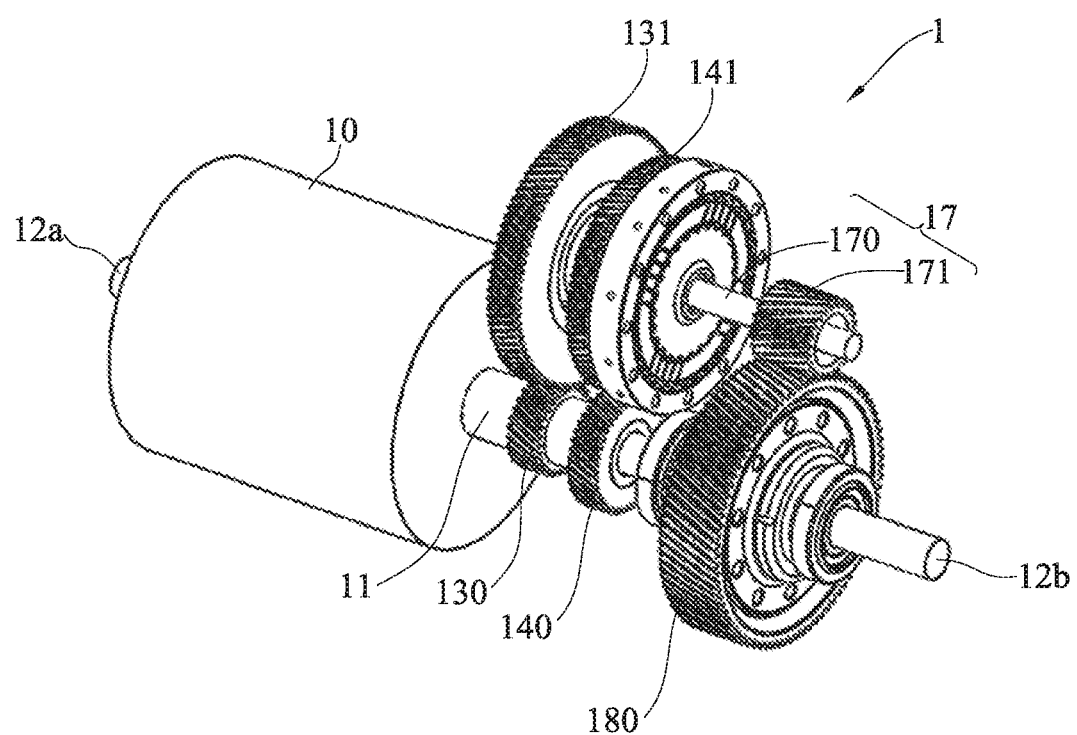
FIG. 2 is a simplified perspective view of the dual-shaft gearbox mechanism in accordance with the present disclosure.

FIG. 1 is a schematic diagram illustrating a dual-shaft gearbox mechanism 1 in accordance with the present disclosure. FIG. 2 is a simplified perspective view of the dual-shaft gearbox mechanism 1 in accordance with the present disclosure. The dual-shaft gearbox mechanism 1 includes: a hollow shaft motor 10 with a hollow shaft 11, a first gear set 14, a second gear set 13, a first shaft 12, a clutch 16, a unidirectional assembly 15, and a transmission mechanism 17 with a second shaft 170. In an embodiment, the first shaft 12 and the second shaft 170 are parallel to each other, and the first gear set 14 and the second gear set 13 shown in FIGS. 1 and 2 are connected to different sides.

The first gear set 14 includes a first transmission gear 140 and a first driven gear 141 engaged with each other. The first transmission gear 140 is co-axially connected with the hollow shaft 11, such that the hollow shaft 11 drives the first transmission gear 140, which in turn drives the first driven gear 141. Power of the first driven gear 141 is outputted via the second shaft 170. It can be appreciated that the first gear set 14 can also be other transmission structures, such as a chain, a belt or other suitable mechanical components, and is not limited to just gears.

The second gear set 13 includes a second transmission gear 130 and a second driven gear 131 engaged with each other. The second transmission gear 130 is co-axially connected with the hollow shaft 11, such that the hollow shaft 11 drives the second transmission gear 130, which in turn drives the second driven gear 131. Power of the second driven gear 131 is outputted via the second shaft 170. It can be appreciated that the second gear set 13 can also be other transmission structures, such as a chain, a belt or other suitable mechanical components, and is not limited to just gears.

The first shaft 12 is a rod that is axially furnished in the hollow shaft 11 and includes a first shaft member 12a and a second shaft member 12b as left- and right-side of an output shaft, respectively, such that power generated by the first gear set 14 or the second gear set 13 drives the rotation of tires on the left and right sides.

The transmission mechanism 17 includes the second shaft 170 and a gear 171 provided on the second shaft 170. In an embodiment, the second shaft 170 is a rod that passes through the gear 171 of the transmission mechanism 17, the first driven gear 141 (and the unidirectional assembly 15) of the first gear set 14, the second driven gear 131 of the second gear set 13 and the clutch 16 for transmitting the power generated by the first gear set 14 or the second gear set 13.

The unidirectional assembly 15 is disposed corresponding to the location of the first driven gear 141 of the first gear set 14, such that the first gear set 14 actuates in co-operation with the unidirectional assembly 15.

In an embodiment, the unidirectional assembly 15 is a one-way bearing for driving the transmission mechanism 17. In another embodiment, the type of transmission mechanism 17 is rod output (or gear output) for driving the gear 171 on the second shaft 170. The gear 171 is meshed with the other gear 180 that is in turn meshed with a differential 18 in order to drive the differential 18.

The clutch 16 is disposed corresponding to the location of the second driven gear 131 of the second gear set 13, and is used to control power of the second gear set 13 input to the gear 171 on the second shaft 170.

In an embodiment, the clutch 16 is a centrifugal clutch, and the gear 171 and the second driven gear 131 are provided on the second shaft 170.

Therefore, when the dual-shaft gearbox mechanism 1 is in a first gear (e.g., a low gear), the power transmission path of the dual-shaft gearbox mechanism 1 is indicated by an arrow A. That is, the hollow shaft motor 10 drives the hollow shaft 11, so that the first transmission gear 140 of the first gear set 14 drives the first driven gear 141. Through the second shaft 170 of the transmission mechanism 17 in cooperation with the unidirectional assembly 15, the gear 171 of the transmission mechanism 17 outputs power to the other gear 180. The other gear 180 then drives the differential 18 to actuate the first shaft member 12a and the second shaft member 12b. As the clutch 16 is not engaged with the second driven gear 131 of the second gear set 13, the second gear set 13 does not output power and is in an idle state.

When the dual-shaft gearbox mechanism 1 is in a second gear (e.g., a high gear), the clutch 16 is engaged with the second driven gear 131 of the second gear set 13 (e.g., the clutch 16 moves towards and engages with the second driven gear 131 of the second gear set 13 in a direction shown by an arrow e), and the power transmission path of the dual-shaft gearbox mechanism 1 is shown by an arrow B. In an embodiment, the hollow shaft motor 10 drives the hollow shaft 11 to drive the second transmission gear 130 of the second gear set 13. The second transmission gear 130 then drives the second driven gear 131 of the second gear set 13. Through the second shaft 170 of the transmission mechanism 17, the gear 171 of the transmission mechanism 17 is driven to output power to the other gear 180. The other gear 180 then drives the differential 18 to actuate the first shaft member 12a and the second shaft member 12b. As the unidirectional assembly 15 is not actuated, the first gear set 14 does not output power and is in an idle state.

In an embodiment, the dual-shaft gearbox mechanism 1 generates a first reduction ratio r1 between the first transmission gear 140 and the first driven gear 141 of the first gear set 14, a second reduction ratio r2 between the second transmission gear 130 and the second driven gear 131 of the second gear set 13, and a third a reduction ratio r3 between the gear 171 of the transmission mechanism 17 and the other gear 180.

In an embodiment, the dual-shaft gearbox mechanism 1 can be applied to a transport machine. By changing the rotational direction of the hollow shaft motor 10, the dual-shaft gearbox mechanism 1 can be applied to a vehicle with reverse gear or no reverse gear, for example, in cars, motorbikes, electric bicycles, golf carts, etc.

Figure 3:
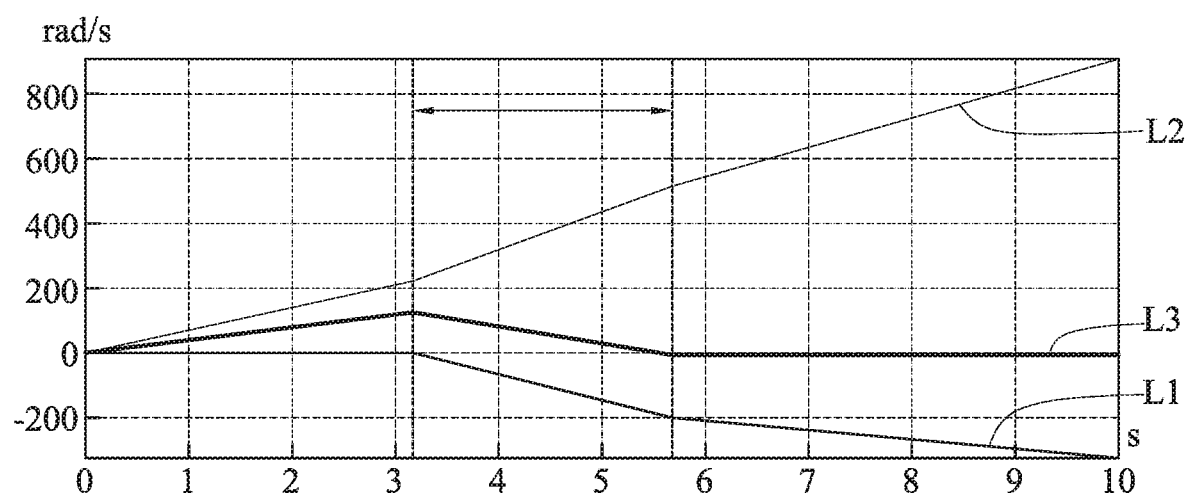
FIG. 3 is a diagram illustrating testing analysis of the dual-shaft gearbox mechanism in accordance with the present disclosure.

In an embodiment, with the unidirectional assembly 15 and the clutch 16, the dual-shaft gearbox mechanism 1 experiences a smooth transition during gear shifting as can be seen by a test analysis shown in FIG. 3, wherein a first curve L1 indicates the unidirectional assembly 15, a second curve L2 indicates the output shaft (the first shaft 12) and a third curve L3 indicates the clutch 16.

In summary, the dual-shaft gearbox mechanism 1 according to the present disclosure is capable of providing two power outputs through the use of two gear sets and two shafts in conjunction with the clutch and the unidirectional assembly. Compared to the prior art, the transmission mechanism of the present disclosure is simple and practical.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A dual-shaft gearbox mechanism, comprising:
    a hollow shaft;
    a hollow shaft motor for driving the hollow shaft;
    a first shaft axially furnished in the hollow shaft;
    a first gear set including a first transmission gear connected to the hollow shaft;
    a second gear set including a second transmission gear connected to the hollow shaft;
    a unidirectional assembly connected to the first gear set;
    a clutch connected to the second gear set; and
    a transmission mechanism coupled with the first gear set or the second gear set.

2. The dual-shaft gearbox mechanism of claim 1, wherein the hollow shaft motor rotates in a clockwise or anticlockwise direction to drive the first gear set or the second gear set in order to change a direction of a transport machine.

3. The dual-shaft gearbox mechanism of claim 1, wherein the hollow shaft is configured to transmit power generated by the hollow shaft motor to the first gear set or the second gear set.

4. The dual-shaft gearbox mechanism of claim 1, wherein the first shaft and the hollow shaft are on the same axis.

5. The dual-shaft gearbox mechanism of claim 1, wherein the first gear set further includes a driven gear coupled with the unidirectional assembly.

6. The dual-shaft gearbox mechanism of claim 5, wherein the unidirectional assembly is coupled with the driven gear of the first gear set, and the driven gear is configured to drive the transmission mechanism.

7. The dual-shaft gearbox mechanism of claim 1, wherein the second gear set further includes a driven gear coupled with the clutch.

8. The dual-shaft gearbox mechanism of claim 7, wherein the clutch is coupled with the driven gear of the second gear set, and the driven gear is configured to drive the transmission mechanism.

9. The dual-shaft gearbox mechanism of claim 1, wherein the transmission mechanism further includes a second shaft coupled with the first gear set or the second gear set and a gear coupled with the second shaft.

10. The dual-shaft gearbox mechanism of claim 1, further comprising a differential connected to the first shaft and coupled with the transmission mechanism.

11. The dual-shaft gearbox mechanism of claim 10, wherein the transmission mechanism is coupled to the differential via a gear.

12. The dual-shaft gearbox mechanism of claim 1, wherein the unidirectional assembly is a one-way bearing.

13. The dual-shaft gearbox mechanism of claim 1, having a power transmission path in a first gear, wherein the power transmission path includes the hollow shaft driving the first transmission gear of the first gear set via the hollow shaft motor, and the first transmission gear in turn driving the transmission mechanism in cooperation with the unidirectional assembly to output power to a differential.

14. The dual-shaft gearbox mechanism of claim 13, wherein the power transmission path in the first gear outputs power via the first gear set, and the second gear set is in an idle state.

15. The dual-shaft gearbox mechanism of claim 1, having a power transmission path in a second gear, wherein the power transmission path includes the hollow shaft driving the second transmission gear of the second gear set via the hollow shaft motor, and the second transmission gear in turn driving the transmission mechanism in cooperation with the clutch to output power to a differential.

16. The dual-shaft gearbox mechanism of claim 15, wherein the clutch in the second gear engages the second gear set.

17. The dual-shaft gearbox mechanism of claim 15, wherein the power transmission path in the second gear outputs power via the second gear set, and the first gear set is in an idle state.

18. The dual-shaft gearbox mechanism of claim 1, wherein the first gear set further includes a driven gear coupled with the first transmission gear to drive the transmission mechanism.

19. The dual-shaft gearbox mechanism of claim 1, wherein the second gear set further includes a driven gear coupled with the second transmission gear to drive the transmission mechanism.

* * * * *